United States Patent
Lee et al.

(10) Patent No.: US 8,315,014 B2
(45) Date of Patent: Nov. 20, 2012

(54) PERPENDICULAR MAGNETIC RECORDING HEAD AND METHOD OF MANUFACTURING THE SAME

(75) Inventors: Joo-ho Lee, Hwaseong-si (KR); Kook-hyun Sunwoo, Hwaseong-si (KR); Eun-sik Kim, Seoul (KR); Kyoung-won Na, Seoul (KR); Sang-hun Lee, Seoul (KR)

(73) Assignee: Seagate Technology International, Cupertino, CA (US)

( * ) Notice: Subject to any disclaimer, the term of this patent is extended or adjusted under 35 U.S.C. 154(b) by 1039 days.

(21) Appl. No.: 12/123,492

(22) Filed: May 20, 2008

(65) Prior Publication Data

US 2009/0116144 A1 May 7, 2009

(30) Foreign Application Priority Data

Nov. 7, 2007 (KR) .................. 10-2007-0113188

(51) Int. Cl.
 *G11B 5/127* (2006.01)
(52) U.S. Cl. .................................. 360/123.05
(58) Field of Classification Search ............ 360/123.05, 360/123.5, 125.12, 123.06, 123.03, 125.18, 360/123.09, 125.3, 125.15, 125.17
See application file for complete search history.

(56) References Cited

U.S. PATENT DOCUMENTS

| | | | | |
|---|---|---|---|---|
| 5,703,740 A * | 12/1997 | Cohen et al. | ............. | 360/125.35 |
| 5,995,342 A * | 11/1999 | Cohen et al. | ............. | 360/125.35 |
| 6,195,232 B1 * | 2/2001 | Cohen | ............. | 360/123.38 |
| 6,417,989 B1 * | 7/2002 | Yang | ............. | 360/121 |
| 6,513,228 B1 * | 2/2003 | Khizroev et al. | ............. | 29/603.14 |
| 6,710,972 B1 * | 3/2004 | Mochizuki et al. | ............. | 360/123.05 |
| 6,950,279 B2 * | 9/2005 | Sasaki et al. | ............. | 360/125.5 |
| 7,031,108 B2 * | 4/2006 | Mochizuki et al. | ............. | 360/123.06 |
| 7,102,854 B2 * | 9/2006 | Wang et al. | ............. | 360/125.5 |
| 7,149,045 B1 * | 12/2006 | Mallary et al. | ............. | 360/55 |
| 7,180,704 B2 * | 2/2007 | Mochizuki et al. | ............. | 360/123.12 |
| 7,443,632 B1 * | 10/2008 | Stoev et al. | ............. | 360/123.05 |
| 7,461,933 B2 * | 12/2008 | Deily et al. | ............. | 347/102 |
| 7,486,475 B2 * | 2/2009 | Biskeborn | ............. | 360/121 |
| 7,526,857 B2 * | 5/2009 | Sasaki et al. | ............. | 29/603.24 |
| 7,679,862 B2 * | 3/2010 | Nakamoto et al. | ............. | 360/125.32 |
| 7,791,838 B2 * | 9/2010 | Sato et al. | ............. | 360/125.02 |
| 7,940,495 B2 * | 5/2011 | Sasaki et al. | ............. | 360/125.27 |
| 2004/0184189 A1 * | 9/2004 | Mochizuki et al. | ............. | 360/125 |
| 2005/0073774 A1 * | 4/2005 | Wang et al. | ............. | 360/126 |
| 2005/0207061 A1 * | 9/2005 | Mochizuki et al. | ............. | 360/123 |
| 2005/0213244 A1 * | 9/2005 | Mochizuki et al. | ............. | 360/123 |
| 2006/0221499 A1 * | 10/2006 | Tagami et al. | ............. | 360/126 |
| 2007/0253106 A1 * | 11/2007 | Sato et al. | ............. | 360/126 |
| 2007/0285837 A1 * | 12/2007 | Im et al. | ............. | 360/126 |
| 2008/0180838 A1 * | 7/2008 | Im et al. | ............. | 360/125.03 |
| 2008/0316645 A1 * | 12/2008 | Sin | ............. | 360/123.02 |
| 2008/0316646 A1 * | 12/2008 | Na et al. | ............. | 360/123.05 |
| 2009/0141406 A1 * | 6/2009 | Sasaki et al. | ............. | 360/319 |

* cited by examiner

*Primary Examiner* — Allen Cao
(74) *Attorney, Agent, or Firm* — Hollingsworth Davis, LLC

(57) ABSTRACT

Provided are a perpendicular magnetic recording head and a method of manufacturing the same. The perpendicular magnetic recording head includes a main pole including a pole tip applying a recording magnetic field to a recording medium, a coil surrounding the main pole in a solenoid shape such that recording magnetic field for recording information to a recording medium is generated at the pole tip, and a return yoke forming a magnetic path for the recording magnetic field together with the main pole and surrounding a portion of the coil passing above the main pole. The number of times that the coil passes above the main pole is smaller than the number of times that the coil passes below the main pole.

8 Claims, 10 Drawing Sheets

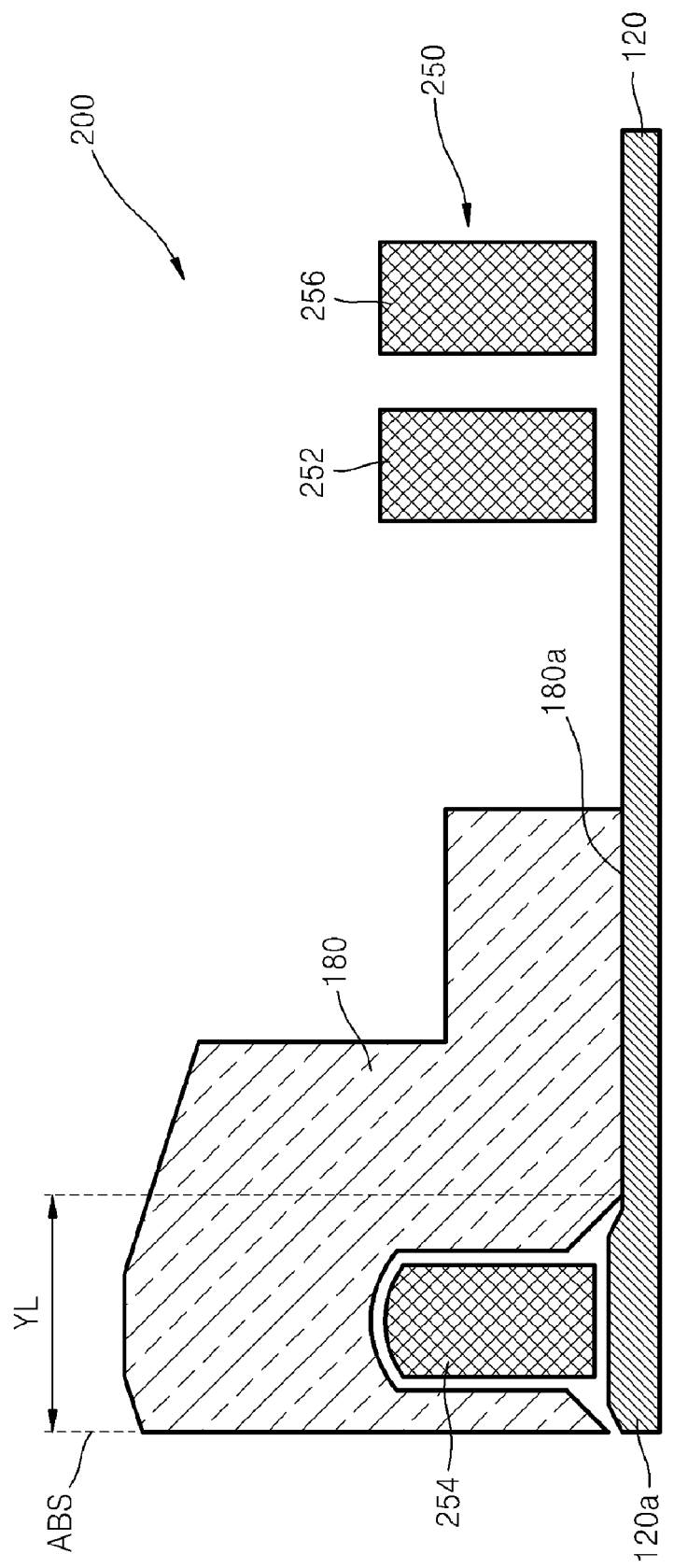

PERPENDICULAR MAGNETIC RECORDING HEAD AND METHOD OF MANUFACTURING THE SAME

CROSS-REFERENCE TO RELATED PATENT APPLICATION

This application claims the benefit of Korean Patent Application No. 10-2007-0113188, filed on Nov. 7, 2007, in the Korean Intellectual Property Office, the disclosure of which is incorporated herein in its entirety by reference.

BACKGROUND OF THE INVENTION

1. Field of the Invention

The present invention relates to a perpendicular magnetic recording head recording information via a perpendicular magnetic recording method, and a method of manufacturing the perpendicular magnetic recording head.

2. Description of the Related Art

There are two types of magnetic recording methods: a longitudinal magnetic recording method and a perpendicular magnetic recording method. In the longitudinal magnetic recording method, information is recorded by magnetizing of a magnetic layer in a direction parallel to a surface of the magnetic layer; in the perpendicular magnetic recording method, information is recorded by magnetizing of a magnetic layer in a direction perpendicular to a surface of the magnetic layer. Regarding the recording density, the perpendicular magnetic recording method is more advantageous than the longitudinal magnetic recording method, and thus perpendicular magnetic recording heads having various structures have been developed.

To improve the recording density, a high-frequency recording characteristic needs to be improved. Improving the high-frequency recording characteristic denotes maintaining a strong recording magnetic field with high frequency and reducing a rise time of the recording magnetic field.

As it is known, it is more advantageous for a perpendicular magnetic recording head to have a shorter yoke to reduce the rise time of the recording magnetic field. However, a shorter yoke generally results in a decrease of the number of coil turns, and thus the recording magnetic field is weakened. Therefore, a perpendicular magnetic recording head capable of maintaining a sufficient recording magnetic field strength in the case of a shortened yoke is necessary.

SUMMARY OF THE INVENTION

The present invention provides a perpendicular magnetic recording head having a structure that improves high-frequency recording characteristics for obtaining high-density magnetic recording and a method of manufacturing the same.

According to an aspect of the present invention, there is provided a perpendicular magnetic recording head including a main pole having a pole tip applying a recording magnetic field to a recording medium, a coil surrounding the main pole in a solenoid shape such that recording magnetic field for recording information to a recording medium is generated at the pole tip, and a return yoke forming a magnetic path for the recording magnetic field together with the main pole and surrounding a portion of the coil passing above the main pole. The coil is wound such that number of times that the coil passes above the main pole is smaller than number of times that the coil passes below the main pole.

According to another aspect of the present invention, there is provided a perpendicular magnetic recording head including a main pole including a pole tip applying a recording magnetic field to a recording medium, a coil surrounding the main pole in a planar spiral shape such that recording magnetic field for recording information to the recording medium is generated at the pole tip, and a return yoke forming a magnetic path for a recording magnetic field together with the main pole and surrounding a portion of the coil. The coil is wound such that number of times that the coil passes in front of the return yoke is smaller than number of times that the coil passes behind the return yoke.

According to another aspect of the present invention, there is provided a method of manufacturing a perpendicular magnetic recording head including sequentially forming a lower coil layer, a main pole, and a first insulation layer; forming an upper coil layer on the first insulation layer; forming a pole tip at an end of the main pole by etching the first insulation layer and the main pole by using the upper coil layer as an etch mask, wherein the pole tip becomes thinner toward an ABS; forming a second insulation layer over the upper coil layer and the pole tip; and forming a return yoke over the second insulation layer, the return yoke surrounding the upper coil layer.

According to another aspect of the present invention, there is provided a method of manufacturing a perpendicular magnetic recording head including: sequentially forming a main pole, a first insulation layer and a coli layer including a front coil and a back coil; forming a pole tip at an end of the main pole by etching the first insulation layer and the main pole by using the front coil as an etch mask, wherein the pole tip becomes thinner toward an ABS; forming a second insulation layer over the front coil and the pole tip; and forming a return yoke over the second insulation layer, the return yoke surrounding the front coil.

BRIEF DESCRIPTION OF THE DRAWINGS

The above and other features and advantages of the present invention will become more apparent by describing in detail exemplary embodiments thereof with reference to the attached drawings in which:

FIG. 3 is a sectional view of a perpendicular magnetic recording head according to another embodiment of the present invention;

DETAILED DESCRIPTION OF THE INVENTION

Figure 1:
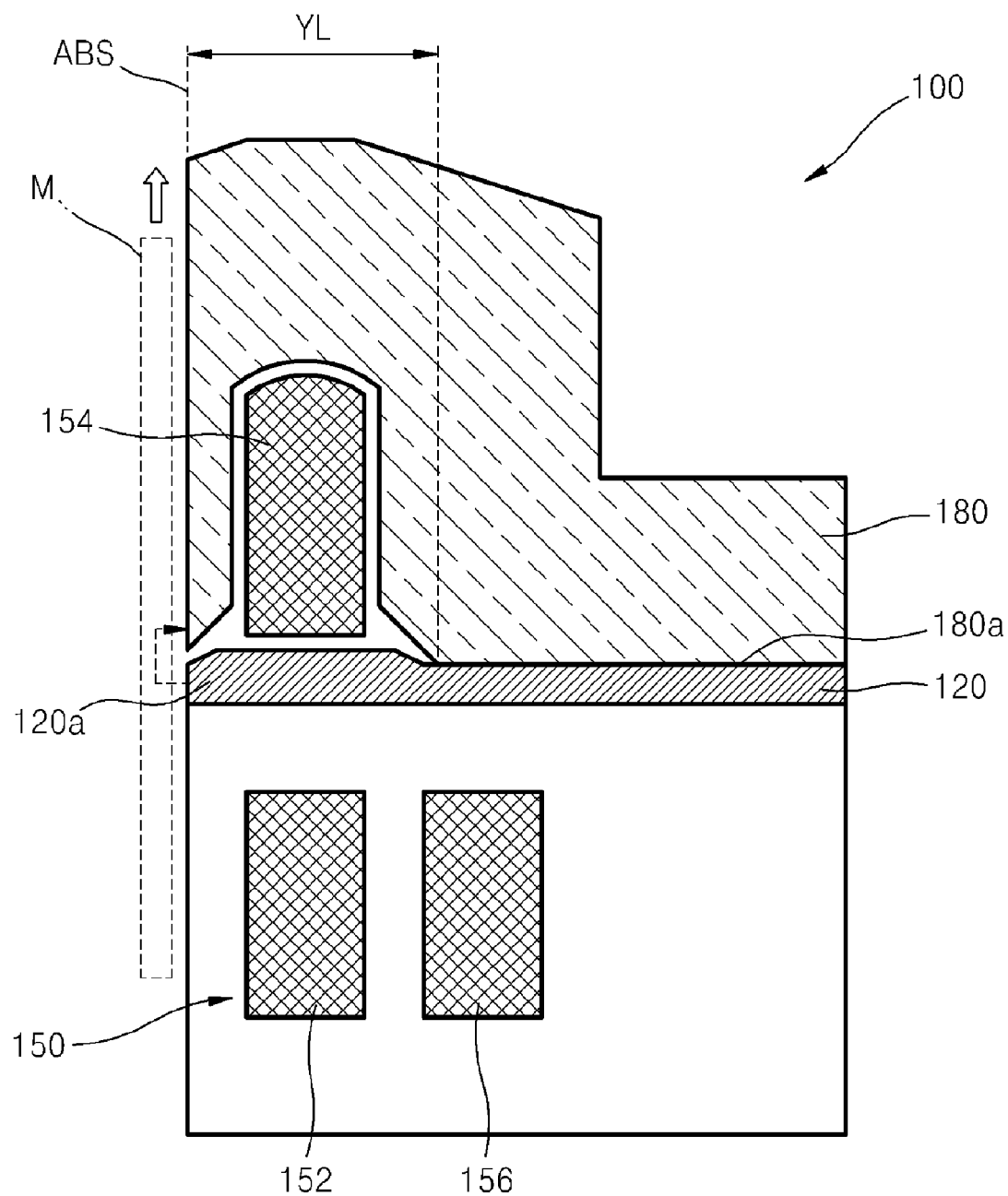
FIG. 1 is a sectional view of a perpendicular magnetic recording head.
Figure 2:
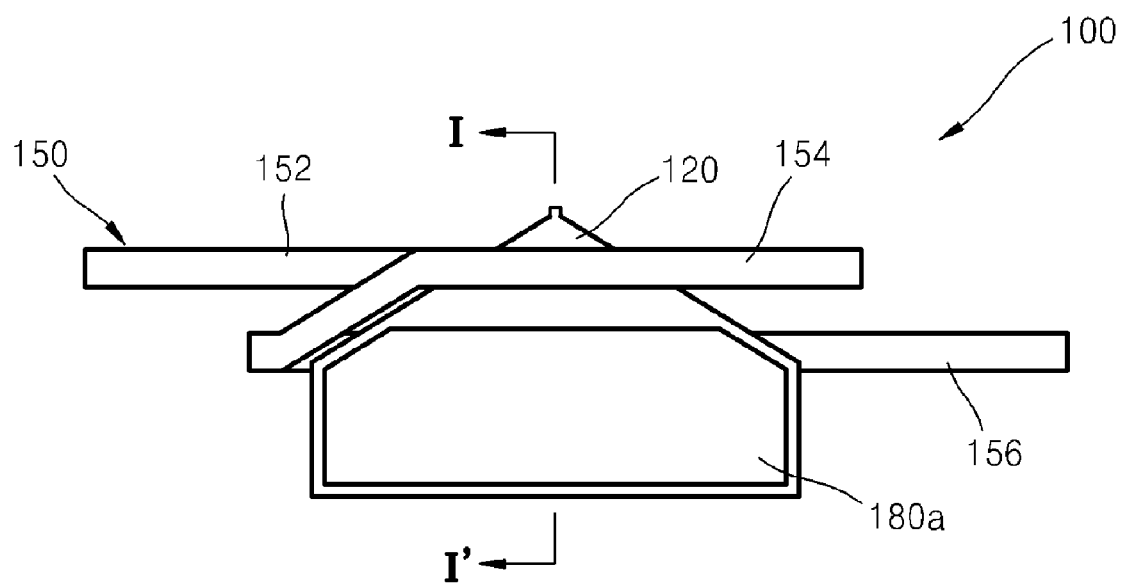
FIG. 2 is a plan view of the perpendicular magnetic recording head of FIG. 1.

FIG. 1 is a sectional view of a perpendicular magnetic recording head 100, and FIG. 2 is a plan view of the perpendicular magnetic recording head 100. FIG. 1 corresponds to a sectional view cut along line I-I' in FIG. 2. In FIG. 2, to illustrate a structure of a coil 150 in detail, only a connecting part 180a at which a return yoke 180 is connected to a main pole 120 is shown and the return yoke 180 is omitted.

Referring to FIGS. 1 and 2, the perpendicular magnetic recording head 100 includes the main pole 120 applying a recording magnetic field toward a recording medium M, the coil 150 to which a voltage is applied such that the recording magnetic field for recording information in the recording medium M is generated from the main pole 120, and the return yoke 180 forming a magnetic path for the recording magnetic field together with the main pole 120.

The perpendicular magnetic recording head 100 moves along a downtrack direction relatively to the recording medium M which is separated from an air bearing surface (ABS) by a certain distance, and performs a recording operation by magnetizing the recording medium M in a direction perpendicular to a surface of the recording medium M via the recording magnetic field formed by the main pole 120. The main pole 120 includes a pole tip 120a at an end of the main pole 120 toward the ABS, the pole tip 120a applying the recording magnetic field to the recording medium M. The pole tip 120a may have, for example, a tapered shape toward the ABS.

The coil 150 surrounds the main pole 120 in a solenoid shape, and number of times that the coil 150 passes above the main pole 120 is smaller than number of times that the coil 150 passes below the main pole 120. For example, as shown in FIG. 1, the coil 150 includes lower coils 152 and 156 and an upper coil 154, and the number of turns of the coil 150 is one-and-half. However, the number of turns of the coil 150 shown in FIG. 1 is merely an example, and the coil 150 may pass above the main pole 120 N times, may pass below the main pole 120 (N+1) times, and thus the number of turns of the coil 150 may be (N+0.5).

The return yoke 180 forms a magnetic path for the recording magnetic field together with the main pole 120, and surrounds the upper coil 154. An end of the return yoke 180 faces the pole tip 120a across a gap, while the other end is connected to the main pole 120a via the connecting part 180a.

The perpendicular magnetic recording head 100 generally includes a reading head (not shown) reading information stored in a recording medium.

The perpendicular magnetic recording head 100 may further include a sub yoke (not shown) disposed on either a top surface or a bottom surface of the main pole 120 to help concentrating the recording magnetic field to the pole tip 120a.

The main pole 120 and the return yoke 180 are formed of a magnetic material to form the magnetic path for the recording magnetic field generated by the coil 150. Particularly, since the main pole 120 applies the recording magnetic field recording information to the recording medium and the magnitude of the recording magnetic field concentrated at the pole tip 120a of the main pole 120 depends on the saturation flux density (Bs), the main pole 120 is formed of a material having relatively greater Bs. Generally, the main pole 120 is formed of a magnetic material having Bs greater than that of a material forming the return yoke 180, such as NiFe, CoFe, CoNiFe, etc. The return yoke 180 may be formed to have magnetic permeability higher than that of the main pole 120 such that the return yoke 180 has shorter rise time with the change of the recording magnetic field at high frequency. A magnetic material such as NiFe is generally used to form the return yoke 180, wherein composition ratio of Ni and Fe is controlled to balance Bs and the magnetic permeability.

The perpendicular magnetic recording head 100 according to the present embodiment maintains a sufficient strength of the recording magnetic field while minimizing the length of a yoke YL. The number of turns of the coil 150 surrounding the main pole 120 is a factor directly affecting the length of the yoke YL. For example, if manufacturing conditions such as controlling thickness of the coil 150 or controlling thickness of a insulation layer insulating between the coil 150 and the return yoke 180 are fixed, the length of the yoke YL become smaller as the number of turns of the coil 150 decreases. Although the rise time of the recording magnetic field is reduced if the length of the yoke is reduced, reducing the length of the yoke by decreasing the number of turns of the coil 150 weakens an magnetomotive force generating the recording magnetic field. The coil 150 according to the present invention has a structure minimizing the length of the yoke more efficiently by minimizing the number of times that the coil 150 passes above the main pole 120, which is between the main pole 120 and the return yoke 180, and increasing the number of times that the coil 150 passes below the main pole 120, which does not affect the length of the yoke YL, such that the coil 150 passes below the main pole 120 more frequently than above the main pole 150, and thus a decrease of the magnetomotive force can be minimized. For example, the minimum value of the length of the yoke YL can be obtained when the coil 150 passes above the main pole 120, which is between the main pole 120 and the return yoke 180, one time. In this case, the length of the yoke and decrease of the magnetomotive force can be minimized by forming the coil 150 in one-and-half turn solenoid structure so that the coil 150 passes below the main pole 120 two times.

Also, the thickness of the pole tip 120a becomes smaller toward the ABS so that the decrease of the recording magnetic field due to the decrease of the magnetomotive force is compensated for.

Table 1 shows a comparison of recording characteristics of the perpendicular magnetic recording head 100 according to an embodiment of the present invention and a perpendicular magnetic recording head according to a comparative example. The perpendicular magnetic recording head according to the comparative example has a one-turn coil structure, that is, a coil passes both above and below the main pole one time.

TABLE 1

|  | current (mA) | Hw (T) | Hr (T) | Gradient1 (Oe/nm) | Hw_eff (T) | Gradient2 (Oe/nm) |
| --- | --- | --- | --- | --- | --- | --- |
| Comparative Example | 30 | 0.681 | −0.0828 | 113.38 | 0.961 | 141.92 |
|  | 40 | 0.876 | −0.0822 | 162.06 | 1.225 | 164.16 |
|  | 50 | 0.993 | −0.0751 | 171.67 | 1.388 | 176.25 |
| Present Embodiment | 30 | 0.711 | −0.0696 | 123.10 | 0.996 | 145.64 |
|  | 40 | 0.922 | −0.0717 | 169.61 | 1.283 | 170.25 |
|  | 50 | 1.026 | −0.0654 | 174.47 | 1.425 | 180.90 |

In Table 1, Hw represents a recording magnetic field, Hr represents a return field, and Hw_eff represents an effective recording magnetic field. The Hw are the maximum values in the recording magnetic field profile, and the Hw values should be large enough to record information. Hr is formed in a direction opposite to a recording direction and has a negative value in the recording magnetic field profile, and thus it is advantageous for recording if an absolute value of the return field is smaller. Hw and Hr represent values of perpendicular components of a magnetic field, while Hw_eff refers to variables in consideration of that not only perpendicular components but also longitudinal components contributing to perpendicular recording. Hw_eff can be defined as following if a Z direction is a perpendicular direction.

$$Hw\_eff = ((H_x^2 + H_y^2)^{1/3} + H_z^{2/3})^{3/2}$$ [Equation 1]

A field gradient is a factor affecting a signal to noise ratio (SNR), and is shown as Gradient1 and Gradient2 in Table 1, respectively, denoting a field gradient at a location corresponding to coercivity of a recording medium and the maximum field gradient of the recording magnetic field.

Referring to Table 1, the perpendicular magnetic recording head 100 has greater Hw, smaller absolute value of Hr, and superior field gradients than the perpendicular magnetic recording head according to the comparative example.

FIG. 3 is a sectional view showing a perpendicular magnetic recording head 200 according to another embodiment of the present invention. The present embodiment differs from the previous embodiment described with reference to FIGS. 1 and 2 in that the coil 250 is formed in a planar spiral shape. Thus, only the coil 250 will be described hereinafter. The coil 250 is formed above the main pole 120, and includes a front coil 254 and back coils 252 and 256. The front coil 254 and the back coils 252 and 256 form the planar spiral shaped coil 250, and the planar spiral shaped coil 250 is formed to pass between the return yoke 180 and the main pole one time and to pass behind the return yoke 180 two times. The term behind the return yoke 180 denotes the opposite side of a side toward the ABS.

In the present embodiment, the decrease of the magnetomotive force according to reduced length of the yoke YL is minimized by adopting a structure in which the number of times that the coil 250 passes between the main pole 120 and the return yoke 180 is decreased and the number of times that the coil 250 passes behind the return yoke 180 is increased, such that the coil 250 passes behind the return yoke 180 more frequently than between the main pole 120 and the return yoke 180. Also, the number of turns of the coil 250, which is one-and-half, is merely an example, and the coil 250 may pass between the main pole 120 and the return yoke 180 N times, may pass behind the return yoke 180 (N+1) times, and thus number of turns of the coil 250 may be (N+0.5). FIGS. 4A through 4F are sectional views for explaining a method of manufacturing the perpendicular magnetic recording head 100 according to an embodiment of the present invention.

Figure 4A:
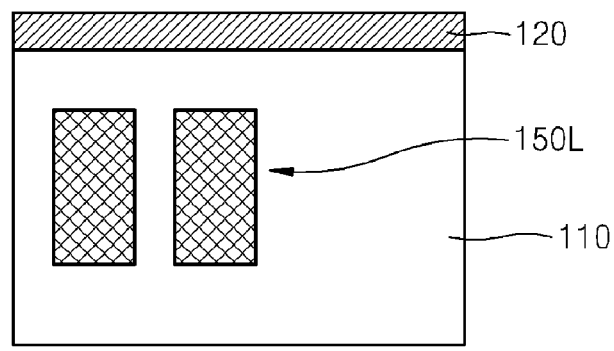
FIGS. 4A through 4F are sectional views for explaining a method of manufacturing the perpendicular magnetic recording head according to an embodiment of the present invention.

Referring to FIG. 4A, an insulation layer 110, a lower coil layer 150L, and the main pole 120 are formed sequentially. The lower coil layer 150L is formed on the partially formed insulation layer 110 by using a plating method, and the rest of the insulation layer 110 is formed to cover the lower coil layer 150L. Although not shown in FIG. 4A, a reading head including a magnetic resisting device is formed below the insulation layer 110.

The main pole 120 is formed on the insulation layer 110 by either plating or depositing a magnetic material having high Bs such as CoFe or CoNiFe.

The lower coil layer 150L forms a portion of a solenoid shaped coil surrounding the main pole 120. As shown in FIG. 4A, the lower coil layer 150L is formed such that the solenoid shaped coil passes below the main pole 120 two times.

Figure 4B:
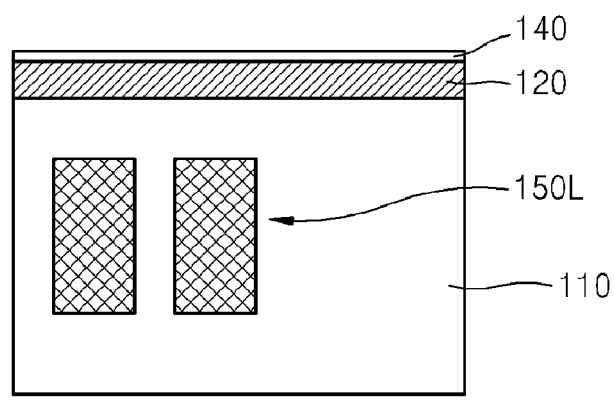

As shown in FIG. 4B, a first insulation layer 140 is formed on the main pole 120. The first insulation layer 140 may be formed by using a photoresist coating method or depositing $Al_2O_3$ by using an atomic layer deposition (ALD) method, for example.

Figure 4C:
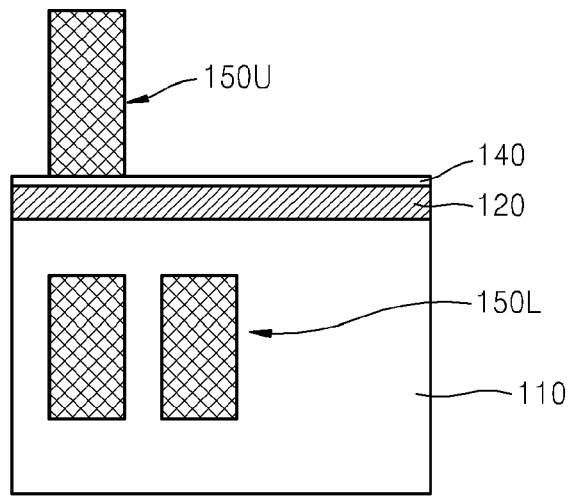

As shown in FIG. 4C, an upper coil layer 150U is formed on the first insulation layer 140. The upper coil layer 150U forms the solenoid shaped coil together with the lower coil layer 150L, and is formed such that the solenoid shaped coil passes above the main pole 120 less frequently than below the main pole 120. As shown in FIG. 4C, the upper coil layer 150U is formed such that the solenoid shaped coil passes above the main pole 120 one time.

Figure 4D:
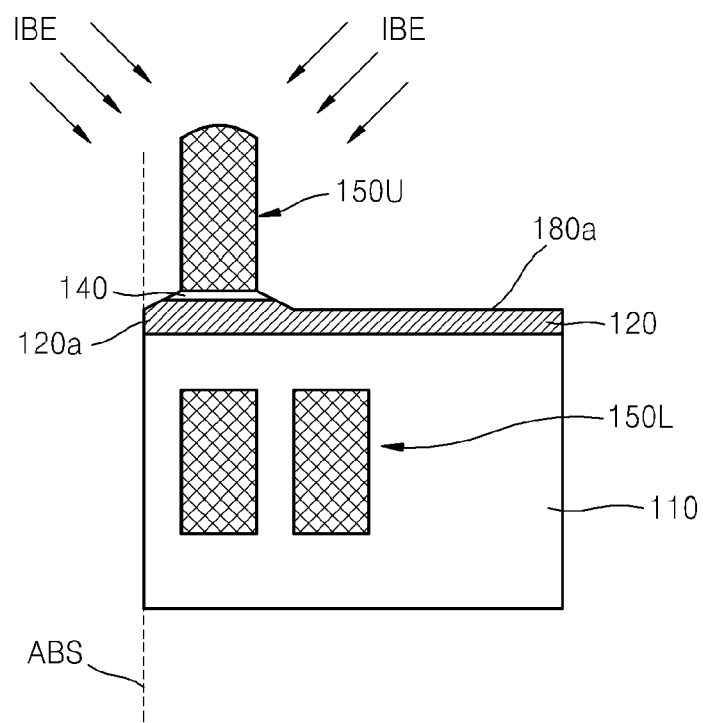

As shown in FIG. 4D, the first insulation layer 140 and the main pole 120 are etched by using the upper coil layer 150U as an etch mask. During the etching process, the pole tip 120a, which becomes thinner toward the ABS, is formed at an end of the main pole 120, and the connecting part 180a which is to be connected to the return yoke 180 is formed on the other end of the main pole 120. The etching process may be performed by using an ion beam etching (IBE) method, and the pole tip 120a is tapered by a shadow effect caused by the upper coil layer 150U. The shape of the pole tip 120a may be adjusted by adjusting the thickness of the upper coil layer 150U, the distance between the ABS and the upper coil layer 150U and etch angle. Accordingly, since the pole tip 120a is tapered toward the ABS to concentrate the recording magnetic field at the pole tip 120a more efficiently by using an etching method with the upper coil layer 150U as an etch mask, the upper coil layer 150U needs to be disposed closer to the ABS. Thus, both manufacturing convenience and appropriate recording characteristics can be obtained.

Figure 4E:
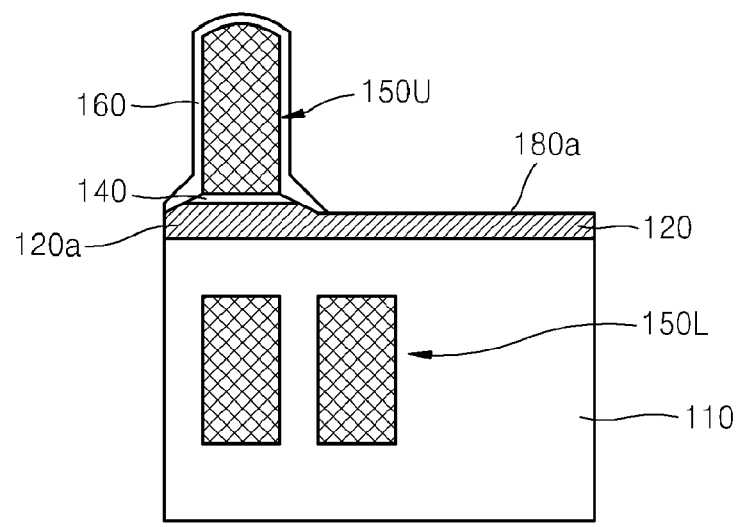

As shown in FIG. 4E, a second insulation layer 160 is formed. The second insulation layer 160 forms a gap between the main pole 120 and the return yoke 180 which are to be formed above the main pole 120, and insulates a space between the upper coil layer 150U and the return yoke 180. The second insulation layer 160 may be formed by using a photoresist coating method or depositing $Al_2O_3$ by using the ALD method, for example.

Figure 4F:
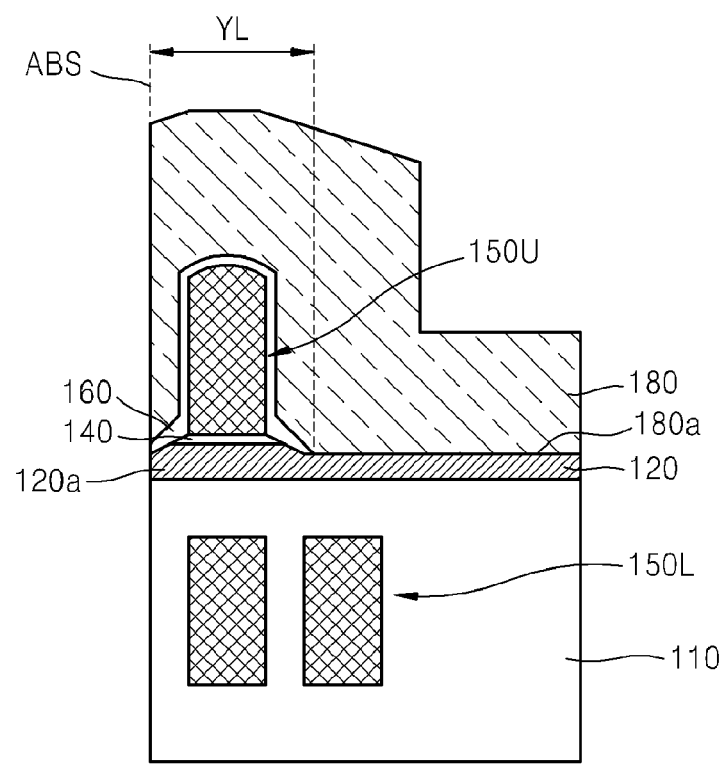

As shown in FIG. 4F, the return yoke 180 is formed. The return yoke 180 may be formed by either plating or depositing a magnetic material having high Bs such as CoFe or CoNiFe.

Throughout the processes mentioned before, the perpendicular magnetic recording head 100 in which the length of the yoke is shortened and the decrease of magnetomotive force are minimized is manufactured.

The method of manufacturing the perpendicular magnetic recording head 100 according to an embodiment of the present invention may further include forming the sub yoke disposed on either a top surface or a bottom surface of the main pole 120 to help concentrating the recording magnetic field at the pole tip 120a of the main pole 120. Also, the solenoid shaped coil may be formed to pass between the main pole 120 and the return yoke 180 N times and to pass below the main pole 120 (N+1) times.

FIGS. 5A through 5D are sectional views for explaining a method of manufacturing the perpendicular magnetic recording head 200 according to another embodiment of the present invention. The present embodiment differs from the previous embodiment described with reference to FIGS. 4A through 4D in that a front coil 250F and a back coil 205B are formed. Thus, only the formation of the coils 250F and 250B will be described hereinafter.

Figure 5A:
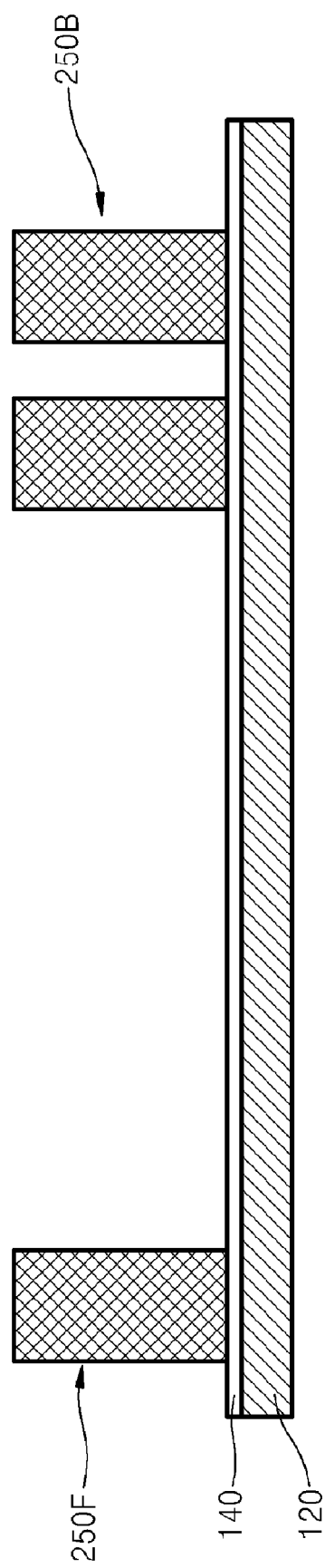
FIGS. 5A through 5D are sectional views for explaining a method of manufacturing a perpendicular magnetic recording head according to another embodiment of the present invention.
Figure 5B:
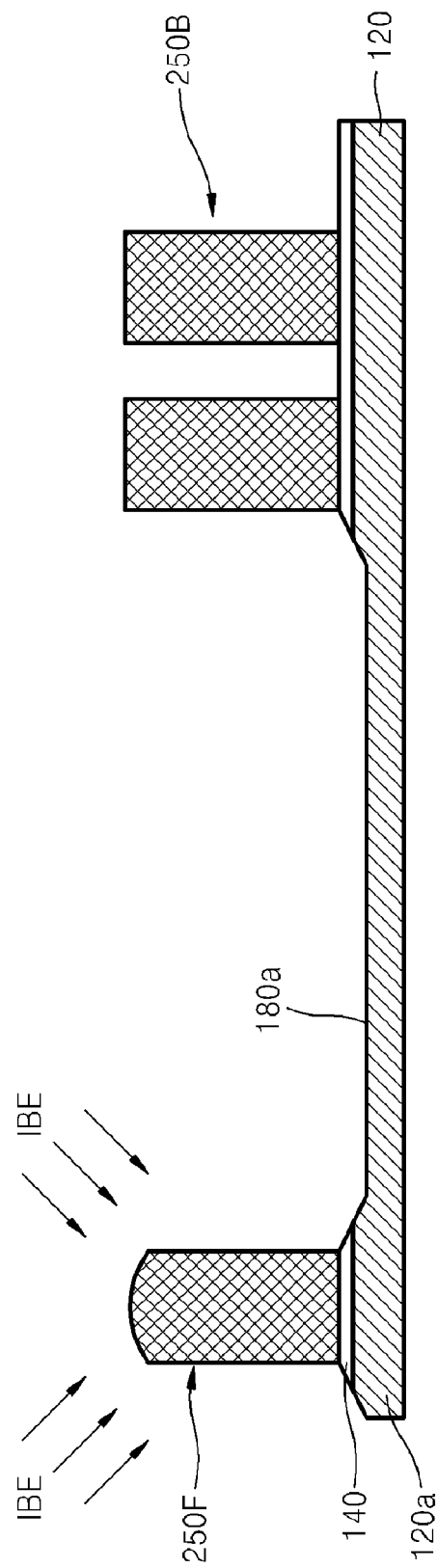
Figure 5C:
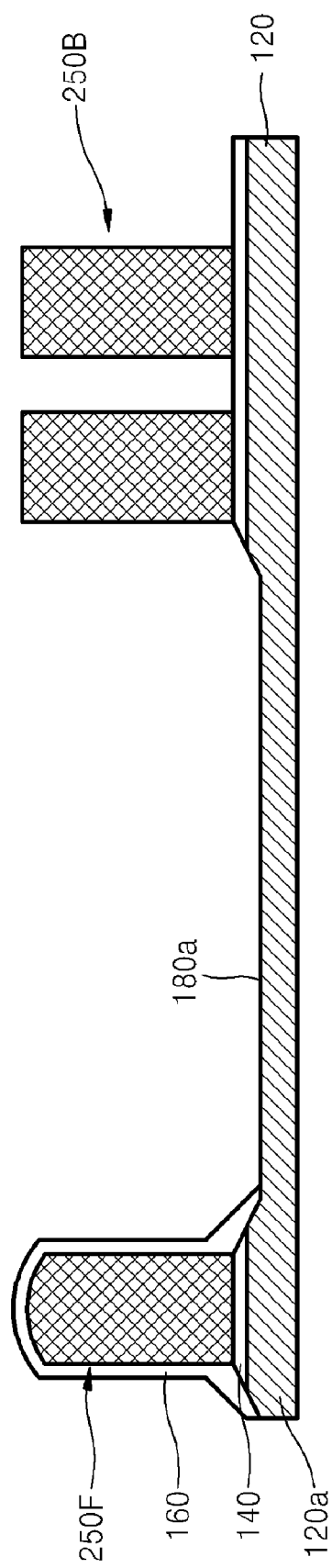
Figure 5D:
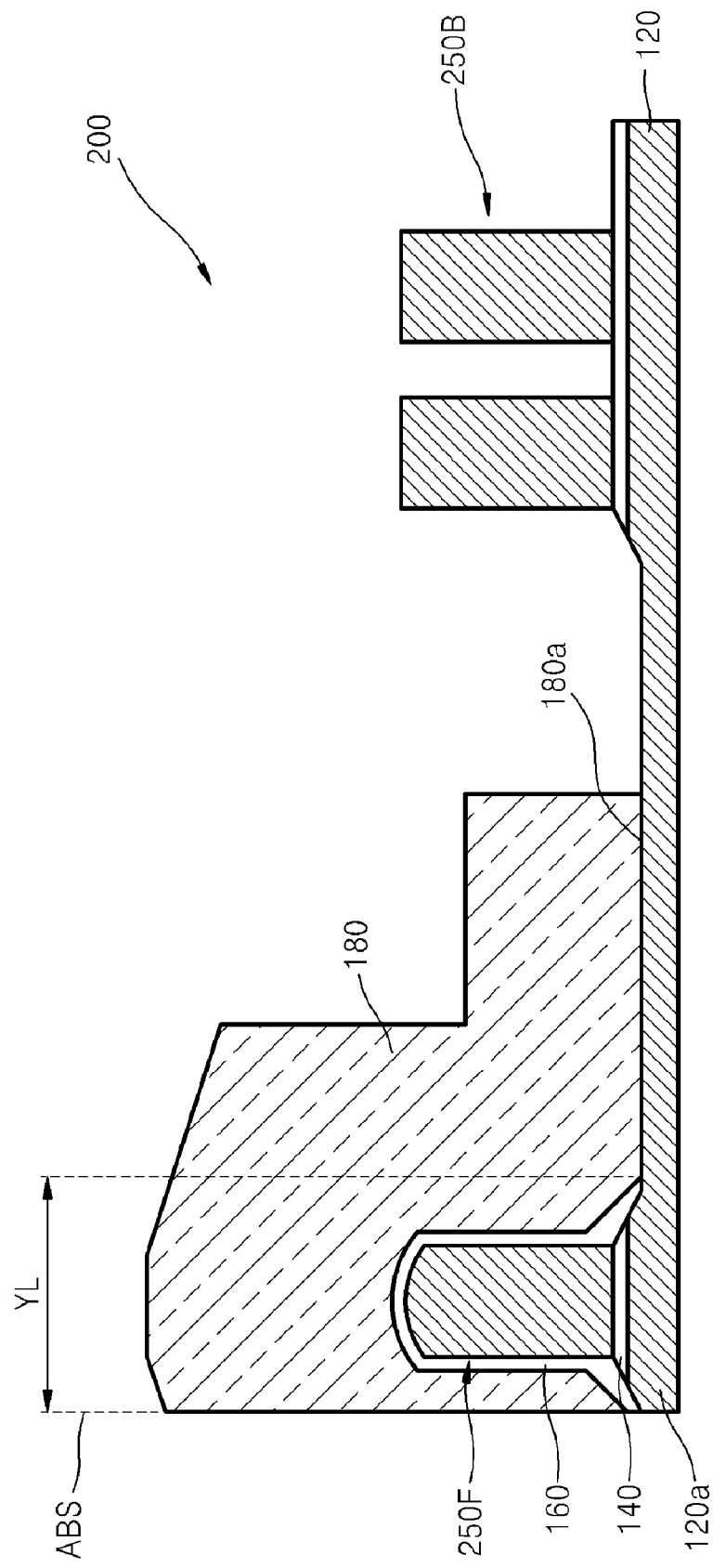

Referring to FIG. 5A, the main pole 120, the first insulation layer 140 and a coil layer including the front coil 250F and the back coil 250B are formed. The front coil 250F and the back coil 250B are formed in a planar spiral shape. As shown in FIG. 5B, the first insulation layer 140 and the main pole 120 are etched by using the front coil 150B as an etch mask to form the pole tip 120a and the connecting part 180a. The second insulation layer 160 is formed over the pole tip 120a and the front coil 250F as shown in FIG. 5C, and the return yoke 180 surrounding the front coil 250F is formed as shown in FIG. 5D.

Throughout the processes mentioned before, the perpendicular magnetic recording head 200 in which the length of the yoke is shortened and the decrease of the magnetomotive force are minimized is manufactured.

Also, the method of manufacturing the perpendicular magnetic recording head 200 according to another embodiment of the present invention may further include the formation of the sub yoke disposed on either a top surface or a bottom surface of the main pole 120 to help concentrating the recording magnetic field at the pole tip 120*a* of the main pole 120, and the planar spiral shaped coil may be formed to pass between the main pole 120 and the return yoke 180 N times and to pass behind the return yoke 180 (N+1) times.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A perpendicular magnetic recording head comprising:
a main pole including a pole tip;
a single coil surrounding the main pole in a solenoid shape; and
a return yoke surrounding an upper portion of the single coil passing above the main pole,
wherein the single coil is formed such that the number of turns of the upper portion of the single coil is smaller than the number of turns of a lower portion of the single coil passing below the main pole.

2. The perpendicular magnetic recording head of claim 1, wherein the main pole becomes thinner toward the pole tip.

3. The perpendicular magnetic recording head of claim 1, wherein the main pole is formed of a material having saturation magnetic flux density greater than that of a material forming the return yoke.

4. The perpendicular magnetic recording head of claim 1, wherein a sub yoke disposed on either a top surface or a bottom surface of the main pole.

5. A perpendicular magnetic recording head apparatus comprising:
a main pole including a pole tip;
a single coil surrounding the main pole in a planar spiral shape; and
a return yoke surrounding a front portion of the single coil,
wherein the single coil is formed such that the number of turns of the front portion of the single coil is smaller than the number of turns of a back portion of the single coil passing behind the return yoke.

6. The perpendicular magnetic recording head of claim 5, wherein the main pole becomes thinner toward the pole tip.

7. The perpendicular magnetic recording head of claim 5, wherein the main pole is formed of a material having saturation magnetic flux density greater than that of a material forming the return yoke.

8. The apparatus of claim 5, wherein a sub yoke is disposed on either a top surface or a bottom surface of the main pole.

\* \* \* \* \*

UNITED STATES PATENT AND TRADEMARK OFFICE
CERTIFICATE OF CORRECTION

PATENT NO. : 8,315,014 B2
APPLICATION NO. : 12/123492
DATED : November 20, 2012
INVENTOR(S) : Joo-ho Lee et al.

It is certified that error appears in the above-identified patent and that said Letters Patent is hereby corrected as shown below:

In the Claims

Column 8, line 6, Claim 4: "yoke disposed" should read --yoke is disposed--.

Column 8, line 8, Claim 5: "head apparatus comprising:" should read --head comprising:--.

Signed and Sealed this
Fifth Day of February, 2013

Teresa Stanek Rea
*Acting Director of the United States Patent and Trademark Office*